(12) United States Patent
Chapman et al.

(10) Patent No.: US 10,974,806 B2
(45) Date of Patent: Apr. 13, 2021

(54) UNIFIED CANOPIES FOR AIRCRAFT

(71) Applicant: Gulfstream Aerospace Corporation, Savannah, GA (US)

(72) Inventors: Mark Chapman, Savannah, GA (US); Bryan Williams, Savannah, GA (US); Dillon Volk, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 352 days.

(21) Appl. No.: 15/725,698

(22) Filed: Oct. 5, 2017

(65) Prior Publication Data

US 2019/0106193 A1  Apr. 11, 2019

(51) Int. Cl.
*B64C 1/14* (2006.01)
*B64C 1/06* (2006.01)

(52) U.S. Cl.
CPC ............. *B64C 1/1476* (2013.01); *B64C 1/06* (2013.01)

(58) Field of Classification Search
CPC ......... B64C 1/1476; B64C 1/12; B64C 1/064; B64D 2045/0095
See application file for complete search history.

(56) References Cited

U.S. PATENT DOCUMENTS

| | | | | |
|---|---|---|---|---|
| 3,071,217 A * | 1/1963 | Gould | ............... | B64C 1/40 52/403.1 |
| 4,052,523 A * | 10/1977 | Rhodes | ............... | B32B 3/12 428/116 |
| 4,725,334 A * | 2/1988 | Brimm | ............... | C23F 1/04 216/34 |
| 7,192,145 B2 * | 3/2007 | Ealey | ............... | G02B 5/08 359/846 |
| 9,138,958 B2 | 9/2015 | Goehlich et al. | | |
| 2001/0015043 A1 * | 8/2001 | Brenneis | ............... | B64C 1/12 52/630 |

(Continued)

FOREIGN PATENT DOCUMENTS

DE 102011085937 A1 5/2013
DE 102012101914 A1 9/2013

(Continued)

OTHER PUBLICATIONS

German Patent and Trademark Office, German Search Report in Application No. 10 2018 124 457.6, dated Mar. 11, 2019.

*Primary Examiner* — Timothy D Collins
*Assistant Examiner* — Terri L Filosi
(74) *Attorney, Agent, or Firm* — LKGlobal | Lorenz & Kopf, LLP

(57) ABSTRACT

An aircraft includes the aircraft component. The aircraft component includes an outer skin portion, a plurality of major stiffeners, and a plurality of minor stiffeners. The outer skin portion has an interior side and an exterior side configured to define an exterior boundary of the aircraft. The major stiffeners are integral with the outer skin portion and extend out from the interior side. The major stiffeners are configured to resist global deflection of the aircraft component in response to a bird strike on the aircraft component. The minor stiffeners are disposed between the major stiffeners, are integral with the outer skin portion, and extend out from the interior side. The minor stiffeners are configured to resist perforation of the aircraft component in response to the bird strike on the aircraft component.

18 Claims, 3 Drawing Sheets

(56) References Cited

U.S. PATENT DOCUMENTS

| | | | |
|---|---|---|---|
| 2004/0055349 A1* | 3/2004 | El-Soudani | B21D 26/08 72/56 |
| 2008/0149769 A1* | 6/2008 | Koch | B64C 1/062 244/121 |
| 2012/0052247 A1* | 3/2012 | Pook | B29C 65/5057 428/161 |
| 2012/0245862 A1* | 9/2012 | Coudouent | G06F 17/5018 702/42 |
| 2014/0186580 A1 | 7/2014 | Weber et al. | |
| 2015/0048207 A1* | 2/2015 | Williams | B64C 3/00 244/123.7 |
| 2016/0046392 A1* | 2/2016 | Gorr | B64C 1/12 244/119 |
| 2016/0362905 A1* | 12/2016 | Harper | E04H 7/00 |
| 2018/0117873 A1* | 5/2018 | duPont | B32B 5/02 |
| 2018/0148152 A1* | 5/2018 | Guilloteau | B64C 1/061 |
| 2018/0148155 A1* | 5/2018 | Guilloteau | B64C 1/069 |

FOREIGN PATENT DOCUMENTS

| | | | |
|---|---|---|---|
| DE | 102012110862 A1 | 5/2014 | |
| JP | 2001310798 A * | 11/2001 | B29D 99/0014 |

\* cited by examiner

UNIFIED CANOPIES FOR AIRCRAFT

TECHNICAL FIELD

The technical field relates generally to aircraft and canopy crowns for aircraft, and more particularly relates to aircraft and unified canopy crowns with integral major and minor stiffeners configured to withstand bird strikes.

BACKGROUND

A conventional passenger aircraft includes a canopy assembly disposed near the front of the aircraft above a flight deck of the aircraft. The canopy assembly typically includes a window, window surrounds, and a crown above the window. A conventional canopy assembly further includes a skin membrane fastened to a frame. The frame resists global deformation of the canopy and the skin membrane has a thickness that resists perforation of the canopy assembly when a bird strikes the skin membrane. These conventional assemblies are typically labor intensive and expensive to install and are typically quite heavy.

As such, it is desirable to provide aircraft and aircraft canopies that require less labor to produce and that weigh less than conventional aircraft and canopy assemblies. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of aircraft components and aircraft are disclosed herein.

In a first non-limiting embodiment, an aircraft component includes, but is not limited to, an outer skin portion, a plurality of major stiffeners, and a plurality of minor stiffeners. The outer skin portion has an interior side and an exterior side configured to define an exterior boundary of an aircraft. The major stiffeners are integral with the outer skin portion and extend out from the interior side. The major stiffeners are configured to resist deflection of the aircraft component in response to a bird strike on the aircraft component. The minor stiffeners are disposed between the major stiffeners, are integral with the outer skin portion, and extend out from the interior side. The minor stiffeners are configured to resist perforation of the aircraft component in response to the bird strike on the aircraft component.

In a second non-limiting embodiment, an aircraft includes, but is not limited to, a nose, a window frame fastened to the nose, a canopy surround portion fastened to the window frame, and a unified crown secured to the window frame and the canopy surround portion. The unified crown has an outer skin portion, a plurality of major stiffeners, and a plurality of minor stiffeners. The outer skin portion has an interior side and an exterior side configured to define an exterior boundary of the aircraft. The major stiffeners are integral with the outer skin portion and extend out from the interior side. The major stiffeners are configured to resist global deflection of the unified crown in response to a bird strike on the unified crown and the major stiffeners intersect each other at nonzero angles. The minor stiffeners are disposed between the major stiffeners, are integral with the outer skin portion, and extend out from the interior side. The minor stiffeners are configured to resist perforation in response to the bird strike on the unified crown.

BRIEF DESCRIPTION OF THE DRAWINGS

Advantages of the present invention will be readily appreciated, as the same become better understood by reference to the following detailed description when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
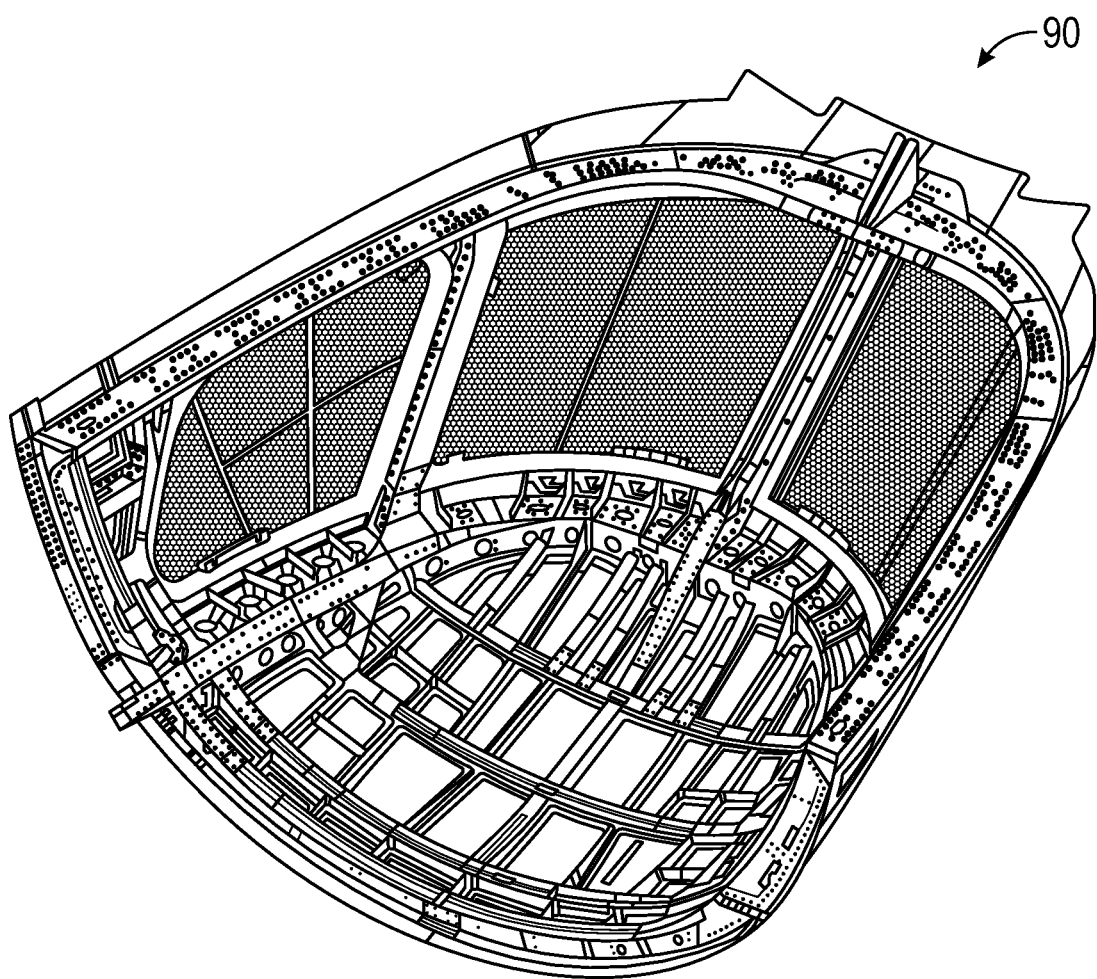
FIG. 1 is a perspective view illustrating a prior art canopy assembly.

FIG. 1 illustrates a prior art canopy assembly 90. A canopy crown of canopy assembly 90 includes an aircraft skin separate from but supported by frame members on the interior of canopy crown 90.

Various non-limiting embodiments of aircraft components and aircraft are disclosed herein. In some embodiments, the aircraft component is a crown of a canopy of the aircraft. The crown is a unified piece that offers lower weight and reduced assembly time compared to conventional canopy assemblies while providing skin perforation and global deflection resistance in response to a bird strike. A greater understanding of the aircraft component and aircraft may be obtained through a review of the illustrations accompanying this application together with a review of the detailed description that follows.

Figure 2:
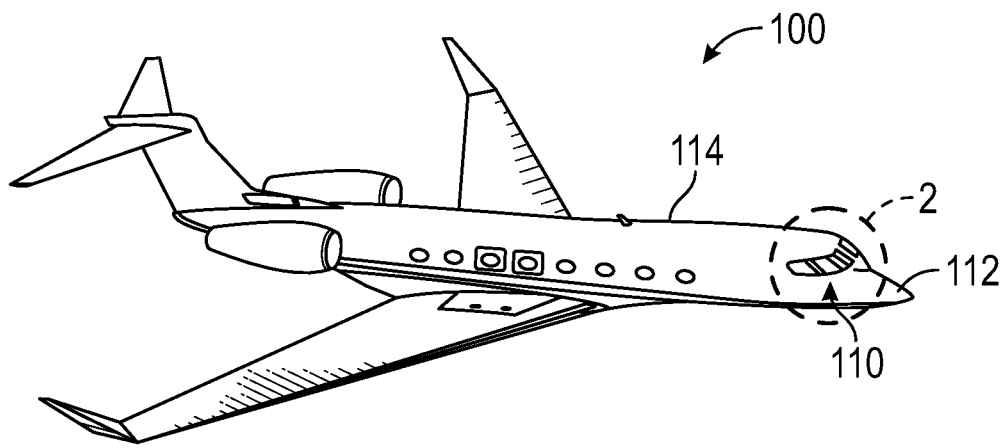
FIG. 2 is a perspective view illustrating a non-limiting embodiment of an aircraft in accordance with the teachings of the present disclosure.

FIG. 2 is an isometric view illustrating a non-limiting embodiment of an aircraft 100 in accordance with the teachings of the present disclosure. In the example provided, aircraft 100 is a transport category aircraft. It should be appreciated that aircraft 100 may be any type of vehicle, such as an airplane, a helicopter, a submarine, and the like without departing from the scope of the present disclosure. Aircraft 100 includes a canopy 110, a nose 112, and a fuselage 114.

Figure 3:
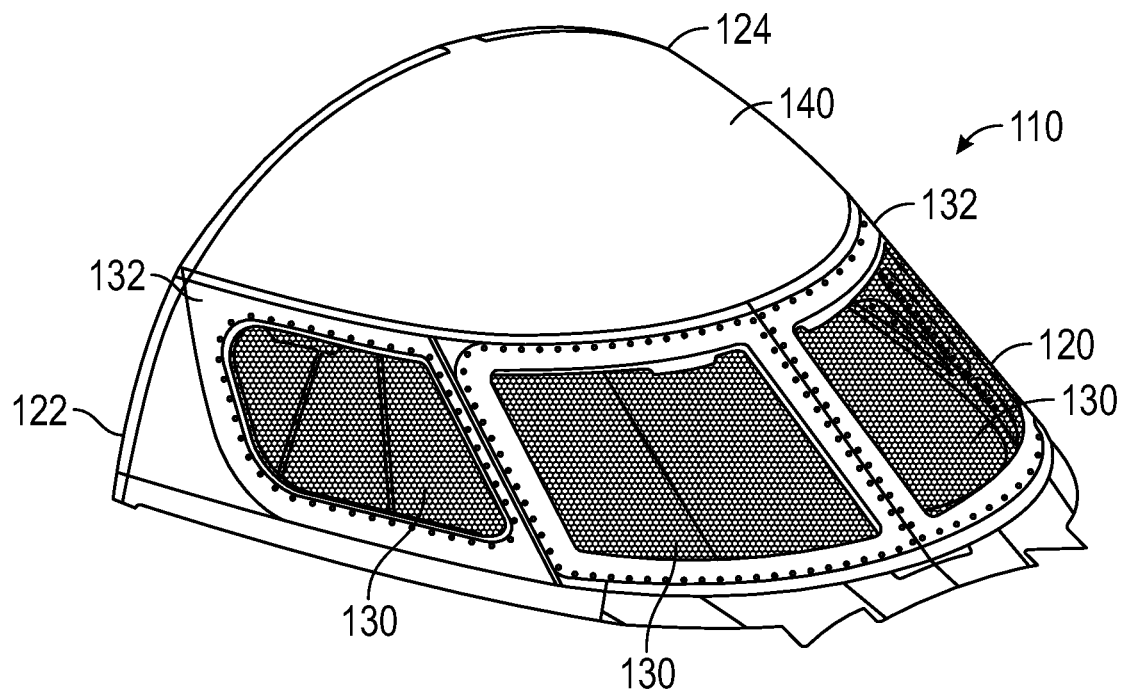
FIG. 3 is an enlarged perspective view illustrating a canopy from the aircraft illustrated in FIG. 2 in accordance with the teachings of the present disclosure.
Figure 4:
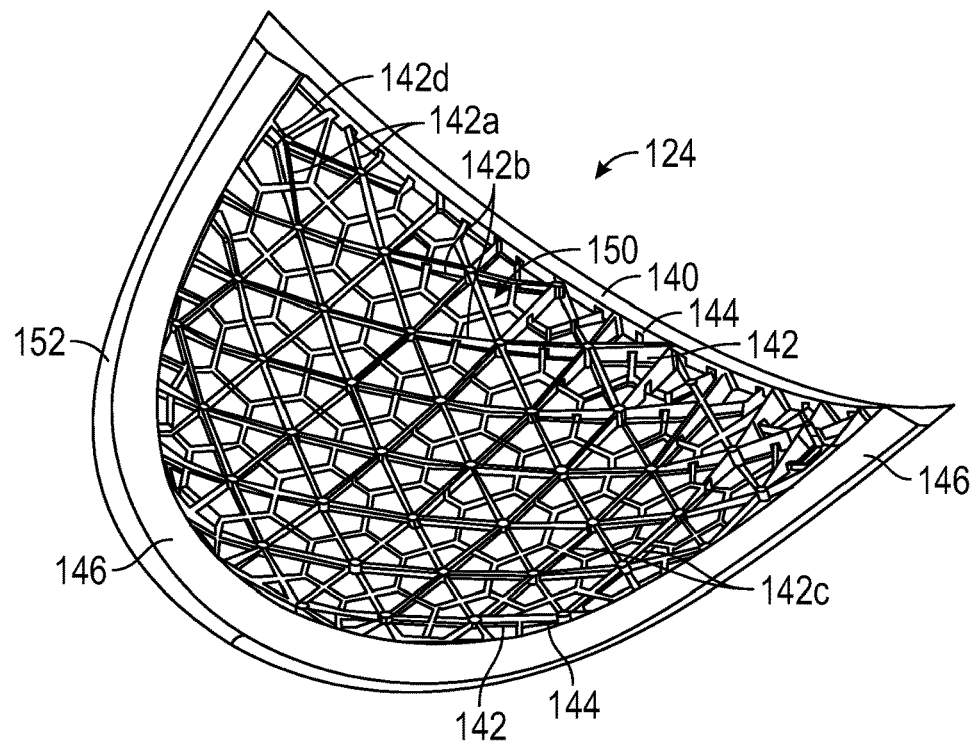
FIG. 4 is a bottom perspective view illustrating a non-limiting embodiment of a crown from the canopy illustrated in FIG. 3.

Referring now to FIGS. 3 and 4, canopy 110 and a crown 124 of canopy 110 are illustrated. Although the disclosure describes canopy 110 as the aircraft component with the features described below, it should be appreciated that other aircraft components may be utilized without departing from the scope of the present disclosure. For example, the features described below may be utilized in nose 112, at a top of a vertical stabilizer, or with any other component that may be struck by birds.

Canopy 110 includes a windshield 120, a surround portion 122, and a crown 124. Windshield 120 includes windows 130 and a window frame 132. Windows 130 permit forward visibility for crew of aircraft 100. Windows 130 are secured to window frame 132, and window frame 132 is fastened to crown 124 and surround portion 122. In some embodiments, window frame 132 is unified with crown 124 and surround portion 122.

Surround portion 122 is disposed below crown 124 to transition the outer mold line of aircraft 100 between nose 112 and fuselage 114. Surround portion 122 fastens to window frame 132 and crown 124. In some embodiments, surround portion 122 is unified as a single piece with window frame 132 and crown 124.

Crown 124 is disposed at a top portion of canopy 110. Crown 124 is a unified single piece with integrated stiffeners. As used herein, the term "unified" means that the material, at transitions between different portions of the unified piece, has substantially the same molecular arrangement as any other portion of the unified piece. The term "unified," as used herein, specifically excludes separate pieces fastened, adhered, welded, or otherwise joined in a manner that does not seamlessly unify the pieces according to the definition provided above. For example, the unified piece may be formed by machining away material from a single piece of material to form the various portions. In the example provided, crown 124 is formed by high energy hydroforming (e.g., explosive forming) followed by machining, as will be described in further detail below.

In some embodiments, the unified piece is created in an additive manufacturing process. For example, the stiffeners may be build up using direct metal deposition (DMD), RAPID PLASMA DEPOSITION™ developed by NORSK TITANIUM, or other material deposition techniques. In some embodiments, the unified piece is created with carbon fiber reinforced plastic (CFRP).

Crown 124 is made from an aluminum alloy. In the example provided, crown 124 is made from Al—Li 2050-T84, as will be appreciated by those with ordinary skill in the art. It should be appreciated that other materials may be used without departing from the scope of the present disclosure. Crown 124 has an outer skin portion 140, a plurality of major stiffeners 142, a plurality of minor stiffeners 144, and a crown frame 146.

Outer skin portion 140 is a curved sheet shaped portion that acts as an outer skin membrane that defines the outer mold line (OML) of crown 124. Outer skin portion 140 has an interior side (illustrated in FIG. 4) and an exterior side (illustrated in FIG. 3). The exterior side is configured to define an exterior boundary of aircraft 100 that contacts an external airflow as aircraft 100 flies through the air. The exterior side has a continuous and substantially smooth convex surface to deflect airflow during flight. The interior side is an interior mold line (IML) that faces a flight deck of aircraft 100, has a concave interior surface, and interfaces with major stiffeners 142, minor stiffeners 144, and crown frame 146.

As used herein, the term "convex surface" means that light reflecting off of the surface diverges such that a focal point of the divergence is beyond the surface at least partially through the canopy. Conversely, as used herein, the term "concave surface" means that light reflecting off of the surface from an interior of the aircraft converges.

Major stiffeners 142 are integral with outer skin portion 140 and extend out from the interior side. Major stiffeners 142 are configured to resist global deflection of crown 124 when a bird strikes crown 124. For example, the major stiffeners 142 may be configured to permit less than 1.5 inches of plastic deformation of major stiffeners 142 in response to a standard bird strike. As used herein, the term "standard bird strike" means a strike from a four pound bird on crown 124 when aircraft 100 is flying at 85% of cruise speed at 8000 feet altitude. Major stiffeners 142 include first direction stiffeners 142a, second direction stiffeners 142b, third direction stiffeners 142c, and crown connection stiffeners 142d. First direction stiffeners 142a are parallel to each other, second direction stiffeners 142b are parallel to each other, and third direction stiffeners 142c are parallel to each other.

Major stiffeners 142a-c intersect other direction major stiffeners 142a-c at nonzero angles to define a repeating major cavity 150. Major cavity 150 is bounded on three sides by each of major stiffeners 142a-c, is closed at a bottom of major cavity 150 by interior side of outer skin portion 140, and is open facing the flight deck of aircraft 100. In the example provided, second direction stiffeners 142b intersect first direction stiffeners 142a at a 60 degree angle, third direction stiffeners 142c intersect first direction stiffeners 142a at a 120 degree angle, and major cavity 150 has a shape that is substantially a triangular prism. It should be appreciated that additional or fewer directional major stiffeners may be incorporated at different angles without departing from the scope of the present disclosure.

Crown connection stiffeners 142d extend from an intersection of major stiffeners 142a-c to crown frame 146. Crown connection stiffeners may be used, for example, where machining separate major stiffeners 142a-c would be impractical or where separate major stiffeners 142a-c are not needed for resisting global deformation of crown 124.

Minor stiffeners 144 are disposed between major stiffeners 142 within major cavity 150, are integral with outer skin portion 140, and extend out from the interior side. Minor stiffeners 144 are configured to resist perforation of crown 124 when a bird strikes crown 124. A thickness of outer skin portion 140 cooperates with minor stiffeners 144 to resist such perforation. For example, as outer skin portion 140 gets thinner, minor stiffeners 144 get deeper, closer together, wider, and/or otherwise fill a larger portion of major cavity 150. In the example provided, outer skin portion 140 is about 0.050 inches thick and minor stiffeners 144 are 0.30 inches deep and 0.080 inches thick.

Minor stiffeners 144 are arranged in a repeating minor pattern and pass through at least one of the major stiffeners 142a-c. In the example provided, the repeating minor patterns are hexagonal shapes centered on an intersection of directional major stiffeners 142a-c.

In the example provided, major stiffeners 142 and minor stiffeners 144 have lateral axes that are normal to outer skin portion 140. Major stiffeners 142 have a first depth normal to outer skin portion 140 and minor stiffeners 144 have a second depth normal to outer skin portion 140. The first depth is larger than the second depth. In the example provided, the depth is uniform throughout a center of crown 124, and increases near crown frame 146 to reduce stresses, as will be appreciated by those with ordinary skill in the art.

In the example provided, major stiffeners 142 have a depth of about 0.65 inches and are separated from other parallel stiffeners of major stiffeners 142 by about 6.2 inches. Minor stiffeners 144 have a depth of about 0.30 inches and intersect at a center of each of the plurality of cavities. The parallel minor stiffeners 144 at opposite sides of each repeating hexagonal shape are separated by about 7.4 inches. It should be appreciated that major and minor stiffeners 142 and 144 may additionally be configured to resist pressure loads typically encountered at crown portions of an aircraft.

Crown frame 146 is integral with outer skin portion 140 and is disposed around a periphery of crown 124 extending out from the interior side. Major stiffeners 142 extend across the interior side from a first portion of the crown frame to a second portion of the crown frame. Major stiffeners 142 are integral with crown frame 146 where major stiffeners 142 intersect crown frame 146. In the example provided, crown frame 146 extends away from the periphery of outer skin portion 140 at an angle of about 147 degrees as crown frame 146 extends away from outer skin portion 140. Crown frame 146 interfaces with outer skin portion 140 about 2.0 inches away from the periphery of outer skin portion 140 to form a lip portion 152.

Figure 5:
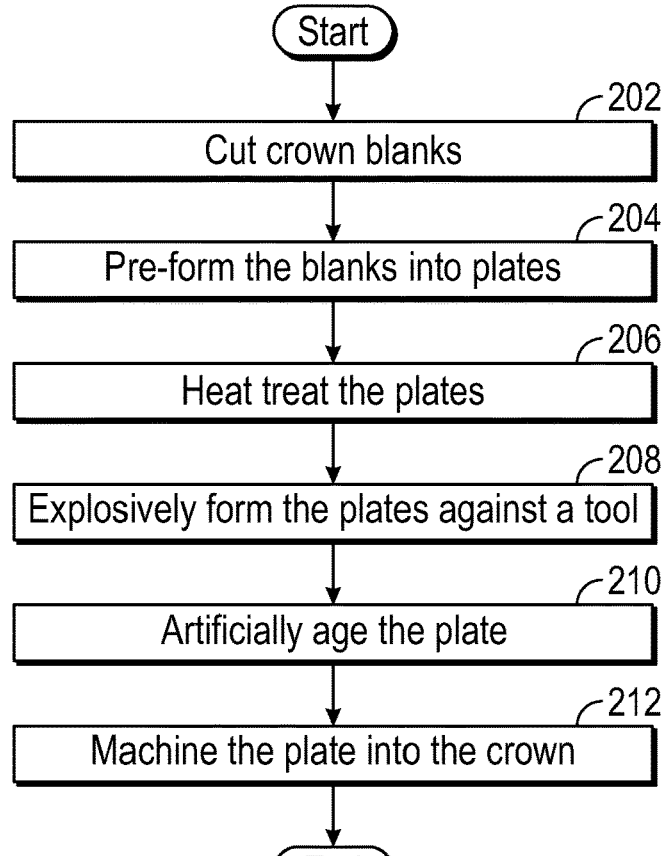
FIG. 5 is a flow diagram illustrating a non-limiting embodiment of a method for forming a unified crown of an aircraft in accordance with the teachings of the present disclosure.

Referring now to FIG. 5, and with continued reference to FIGS. 2-4, a method 200 of forming a unified canopy is illustrated in accordance with some embodiments. Crown blanks are cut in task 202. For example, flat pieces of aluminum may be cut to a shape similar to crown 124.

The crown blanks are pre-formed into plate in task 204. For example, the crown blanks may be rolled to a curved shape. The pre-formed plates are heat treated in task 206. For example, known heat treating processes may be employed in task 206 to reduce residual stress in the plates.

The plates are explosively formed against a tool in task 208. For example, the plates and the tool may be submerged in a tank of water and an explosive may be detonated in the tank to form the plate against the tool, as will be appreciated by those with ordinary skill in the art.

The explosively formed plate is artificially aged in task 210. For example, known aging techniques may be employed in task 210. The aged plate is machined into crown 124 in task 212. For example, a computer numerical control (CNC) milling machine may remove material from the aged plate to form outer skin portion 140, major stiffeners 142, minor stiffeners 144, and crown frame 146.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft component, comprising:
 an outer skin portion having an interior side and an exterior side configured to define an exterior boundary of an aircraft;
 a plurality of major stiffeners unified with the outer skin portion and extending out from the interior side, wherein the plurality of major stiffeners are configured to resist deflection of the aircraft component in response to a bird strike on the aircraft component;
 a plurality of minor stiffeners disposed between the plurality of major stiffeners, unified with the outer skin portion, and extending out from the interior side, wherein the plurality of minor stiffeners are configured to resist perforation of the aircraft component in response to the bird strike on the aircraft component; and
 a crown frame unified with the outer skin portion and disposed around a periphery of the aircraft component extending out from the interior side, and
 wherein the plurality of major stiffeners extend across the interior side from a first portion of the crown frame to a second portion of the crown frame.

2. The aircraft component of claim 1, wherein the plurality of major stiffeners and the plurality of minor stiffeners have lateral axes that are normal to the outer skin portion.

3. The aircraft component of claim 2, wherein the plurality of major stiffeners intersect each other at nonzero angles.

4. The aircraft component of claim 2, wherein the plurality of major stiffeners intersect each other to define a repeating major cavity that has a shape that is substantially a triangular prism.

5. The aircraft component of claim 2, wherein the plurality of major stiffeners include a plurality of first direction stiffeners, a plurality of second direction stiffeners intersecting the plurality of first direction stiffeners at a 60 degree angle, and a plurality of third direction stiffeners intersecting the plurality of first direction stiffeners at a 120 degree angle.

6. The aircraft component of claim 1, wherein the plurality of minor stiffeners are arranged in a repeating pattern and pass through at least one of the plurality of major stiffeners.

7. The aircraft component of claim 6, wherein the repeating pattern is centered on an intersection of two of the plurality of major stiffeners.

8. The aircraft component of claim 7, wherein the repeating pattern is a hexagonal shape.

9. The aircraft component of claim 1, wherein the plurality of major stiffeners have a first depth normal to the outer skin portion, the plurality of minor stiffeners have a second depth normal to the outer skin portion, and the first depth is larger than the second depth.

10. The aircraft component of claim 1, wherein each of the plurality of major stiffeners has a depth of about 0.65 inches and is separated from each other parallel major stiffener of the plurality of major stiffeners by about 6.2 inches.

11. The aircraft component of claim 10, wherein the plurality of major stiffeners form a plurality of cavities, and wherein the plurality of minor stiffeners have a depth of about 0.3 inches and intersect at a center of each of the plurality of cavities.

12. The aircraft component of claim 1, wherein the exterior side has a convex surface that defines a crown of the aircraft, and wherein the interior side has a concave interior surface.

13. An aircraft, comprising:
 a nose;
 a window frame fastened to the nose;
 a canopy surround portion fastened to the window frame; and
 a unified crown secured to the window frame and the canopy surround portion, the unified crown comprising:
  an outer skin portion having an interior side and an exterior side configured to define an exterior boundary of the aircraft;
  a plurality of major stiffeners integral with the outer skin portion and extending out from the interior side, wherein the plurality of major stiffeners are configured to resist deflection of the unified crown in response to a bird strike on the aircraft component, wherein the plurality of major stiffeners intersect each other;
  a plurality of minor stiffeners disposed between the plurality of major stiffeners, integral with the outer skin portion, and extending out from the interior side, wherein the plurality of minor stiffeners are configured to resist perforation of the unified crown in response to the bird strike on the aircraft component; and a crown frame integral with the outer skin portion and disposed around a periphery of the unified crown extending out from the interior side, and wherein the plurality of major stiffeners extend across the interior side from a first portion of the crown frame to a second portion of the crown frame.

14. The aircraft of claim 13, wherein the plurality of major stiffeners and the plurality of minor stiffeners are normal to the outer skin portion, the plurality of major stiffeners have a first depth normal to the outer skin portion, the plurality of minor stiffeners have a second depth normal to the outer skin portion, and the first depth is larger than the second depth.

15. The aircraft of claim 14, wherein the plurality of major stiffeners include a plurality of first direction stiffeners, a plurality of second direction stiffeners intersecting the plurality of first direction stiffeners at a 60 degree angle, and a plurality of third direction stiffeners intersecting the plurality of first direction stiffeners at a 120 degree angle to define a repeating major cavity that has a shape that is substantially a triangular prism.

16. The aircraft of claim 14, wherein the plurality of minor stiffeners are arranged in a repeating pattern and pass through at least one of the plurality of major stiffeners, and wherein the repeating pattern is centered on an intersection of two of the plurality of major stiffeners.

17. The aircraft of claim 16, wherein the plurality of major stiffeners have a depth of about 0.65 inches, form a plurality of cavities, and are separated from other parallel major stiffeners of the plurality of major stiffeners by about 6.2 inches.

18. The aircraft of claim 17, wherein the repeating pattern is a hexagonal shape, the plurality of minor stiffeners have a depth of about 0.3 inches, and the plurality of minor stiffeners intersect at a center of each of the plurality of cavities.

* * * * *